United States Patent [19]

Seger

[11] 4,403,523
[45] Sep. 13, 1983

[54] REVERSIBLE STEPPING ACTUATOR

[75] Inventor: Fritz O. Seger, Mission Viejo, Calif.

[73] Assignee: Smith International, Inc., Newport Beach, Calif.

[21] Appl. No.: 276,653

[22] Filed: Jun. 23, 1981

[51] Int. Cl.³ ............................................ F16H 27/02
[52] U.S. Cl. ...................................... 74/128; 74/152; 74/155; 74/822; 251/58
[58] Field of Search ............ 74/128, 152, 155, 813 C, 74/813 L, 822, 825; 139/324; 251/58, 230

[56] References Cited

U.S. PATENT DOCUMENTS

| | | | |
|---|---|---|---|
| 2,600,128 | 6/1952 | Reynolds | 74/128 |
| 2,684,597 | 7/1954 | Binks | 74/155 |
| 2,715,840 | 8/1955 | Binks et al. | 74/128 |
| 3,186,260 | 6/1965 | Dugas | 74/822 |
| 3,501,968 | 3/1970 | Fredell | 74/128 |
| 3,967,508 | 7/1976 | Burke | 74/128 |
| 4,180,238 | 12/1979 | Muchow | 254/58 |

*Primary Examiner*—Henry Jaudon
*Attorney, Agent, or Firm*—Christie, Parker & Hale

[57] ABSTRACT

A high torque reversible stepping actuator for valves can drive in small increments in response to fluid pressue pulses. The stepping actuator has oppositely facing ratchet wheels on a common shaft linked to the stepping actuator output. A pair of operator means can drive the ratchet wheels in opposite directions. Each operator means comprises a fluid pressure actuator connected to a drive pawl for driving one of the ratchet wheels in one direction. A pair of locking pawls normally engage the ratchet wheels preventing rotation in either direction. The fluid pressure actuator disengages one of the locking pawls sequentially before engaging the drive pawl with the ratchet wheel, thereby permitting advance of the ratchet wheel. The other locking pawl remains engaged and prevents back drive of the ratchet wheels and stepping actuator due to elastic deformation of the drive train connecting the ratchet wheel with the valve or other mechanism being driven.

34 Claims, 3 Drawing Figures

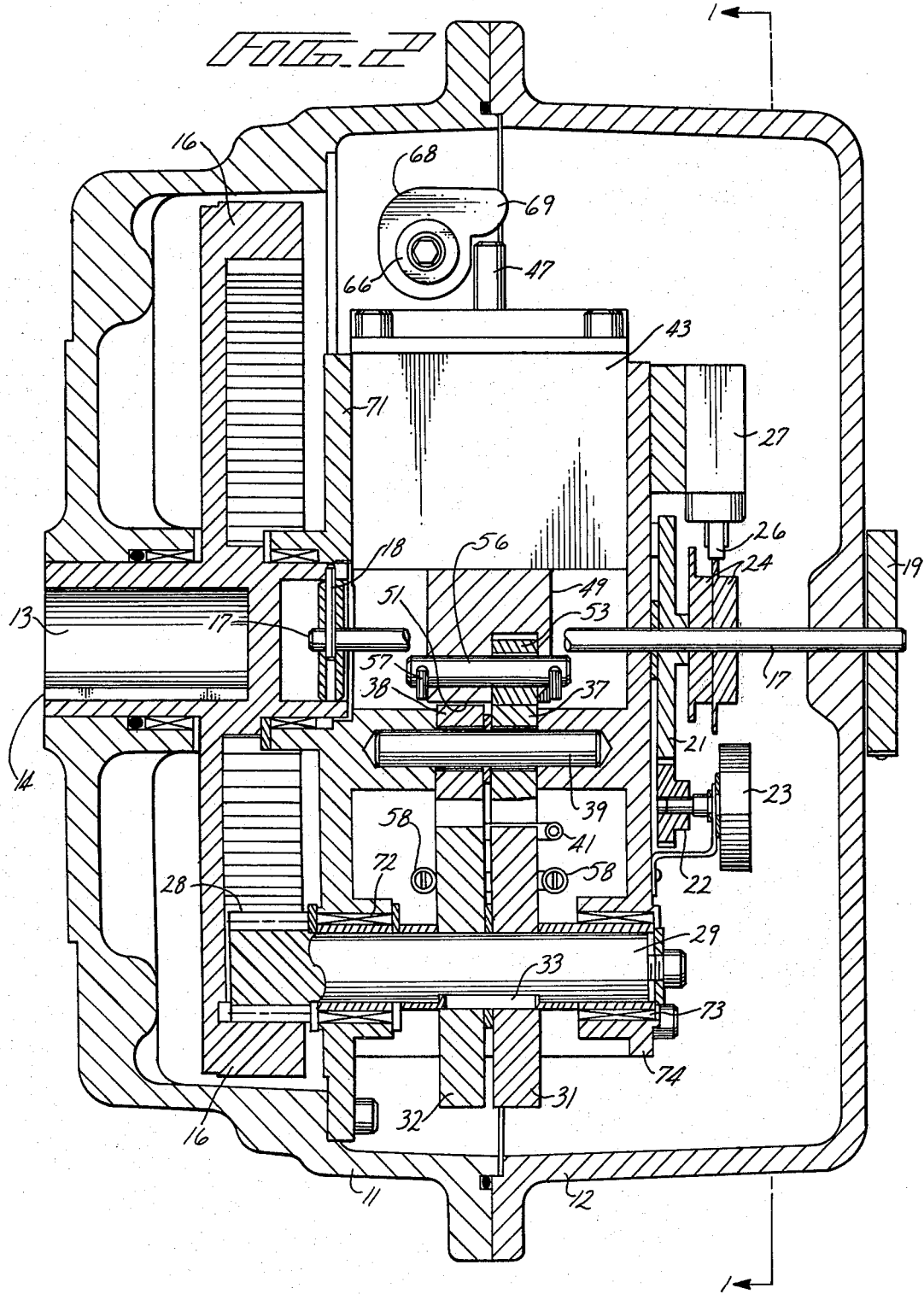

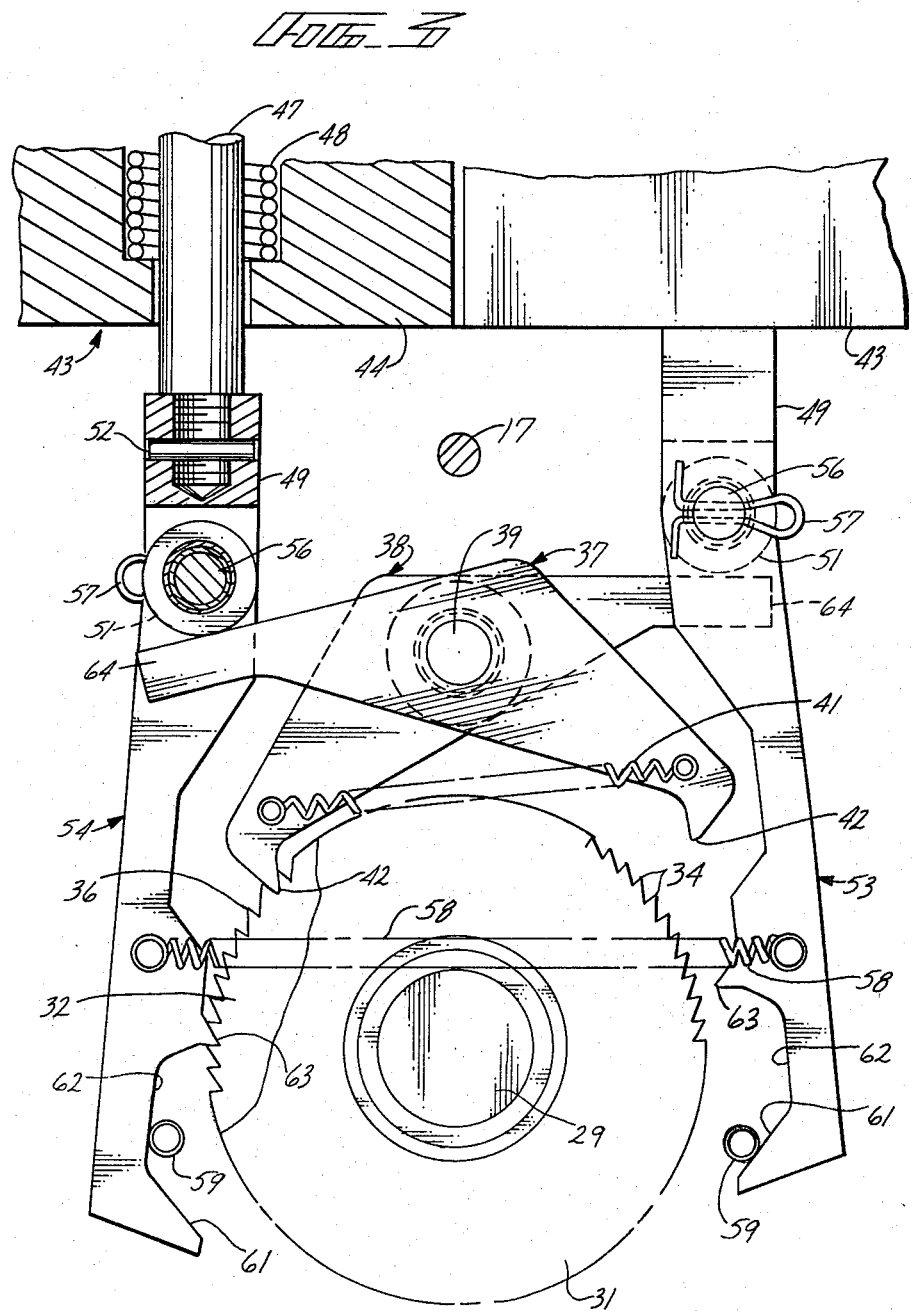

REVERSIBLE STEPPING ACTUATOR

FIELD OF THE INVENTION

This invention concerns a high torque rotary actuator for valves or the like, which can drive reversibly in small increments in response to fluid pressure pulses or the like.

BACKGROUND OF THE INVENTION

Multiple orifice disk valves such as disclosed in U.S. Pat. Nos. 3,207,181 and 3,331,396 by Willis are often used on oil or gas wells where very high pressures prevail. Such a valve has two disks in tight face-to-face engagement. Each disk has two holes and the valve is opened or closed by rotating one of the disks relative to the other to move the holes into or out of alignment. Because of the high pressures the frictional resistance to turning of the movable disk can be extremely high. The turning torque for such a valve can exceed ten thousand inch pounds.

Such valves are used for controlling the flow of fluid from oil and gas wells and precise positioning of the valve opening is important. Such a valve moves from a closed position to a fully opened position with 90° of disk rotation. It is therefore important to turn the valve in very small increments for precise flow control.

Such valves can be operated by a pneumatic or hydraulic stepping actuator. In such an actuator a drive shaft is rotated in a plurality of small increments, each increment corresponding to a pulse of pneumatic pressure applied to the actuator. The drive shaft is geared to the valve stem with a large gear ratio so that the angle through which the valve stem rotates is a fraction of the angle through which the drive shaft rotates in each increment. The large gear ratio also assures adequate torque for operating a valve with a relatively small force input at the stepping actuator.

Considerable difficulty can be involved in a stepping actuator for a multiple orifice disk valve operated at high pressure because of the high torque required to turn the movable disk. The magnitude of the torque is such that the valve stem and the fork used for turning the movable disk elastically deform in torsion by many degrees. For example, when it is desired to move a valve from the closed position, several increments in the stepping actuator can be required to apply increasing torque to the valve stem which "winds up" until sufficient torque is applied to move the valve disk. Once the valve stem and other elements of the structure are "wound up" to the extent required to move the disk, each increment in the stepping actuator is reflected by a corresponding fractional increment of disk rotation. The elastic deformation of the valve stem and turning fork is recovered when the direction of rotation is reversed.

The lag between rotation at the stepping actuator and rotation of the disk is not necessarily a severe problem since the valve opening is often determined by measuring the flow of fluid and adjusting the valve until a desired flow rate is achieved. The principal problem involves operation of the stepping actuator because of the elastic deformation of the valve stem and other components of the drive train between the stepping actuator and the movable disk.

A previous stepping actuator employed a pair of coaxial ratchet wheels fixed together for rotation on a common shaft. A drive pawl engaged each ratchet wheel. A pneumatic or hydraulic actuator connected to such a drive pawl strokes the pawl through a selected distance for engaging a tooth on a ratchet wheel and advancing the ratchet wheel. By using two ratchet wheels such a stepping actuator can be driven in either direction.

A problem with such a stepping actuator when the disk turning torque is high, is the wind-up of the drive train between the ratchet and the movable disk. Thus, when the pawl advances and the ratchet rotates, some of the rotation of the ratchet can be elastic deformation of the drive train. When the pawl retracts to catch the next tooth on the ratchet wheel, the entire drive train can unwind or "back drive" causing the ratchet wheel to retreat following the retracting pawl. When the torque to move the disk is high, the elastic deformation can exceed a full tooth spacing on the ratchet wheel. In such a situation if the pawl advances the ratchet one tooth spacing, the ratchet unwinds the same amount as the pawl retracts and there is no net motion of the disk.

Enlarging the tooth spacing is not regarded as a viable solution to the back drive problem since it degrades the ability to precisely control flow through the valve.

One proposed solution to the back drive problem was to provide a Belleville spring loaded friction plate connected to the ratchet shaft. The force required to rotate the shaft one tooth space increment overcomes the friction of the friction plate plus the friction of the movable disk. Back drive is decreased since the elastic torque is applied against the friction plate. Some of the elastic deformation is thus stored in the drive train instead of being released as back drive of the ratchet. To be effective the friction applied by the friction plate must be a substantial portion of the actual torque required to turn the movable disk. Since this friction acts as the ratchet is advanced, it also reduces the net output of the actuator, thus diminishing the effective torque applied to the movable disk.

Further, the coefficient of friction changes with surface wear, lubrication, temperature and other factors, some of which are unknown. Such changes can make the stepping actuator erratic and unpredictable.

Another proposed solution employs a reverse locking clutch such as a sprag type clutch. Although this can permit successful operation of a stepping actuator, it can add several hundred dollars to the cost.

Another proposed solution is to increase the stroke of the drive pawl for the ratchet to substantially more than one tooth spacing. It is desirable to drive a ratchet more than one tooth spacing and less than two tooth spacings to assure that the ratchet advances one increment. If the stroke of the drive pawl is increased beyond two tooth spacings to compensate for the elastic deformation of the drive train there can be circumstances such that the valve disk is moved two increments instead of the desired one. This can make operation of the valve unpredictable and erratic.

It is therefore desirable to prove a reversible stepping actuator with a high torque output that is not subject to back drive due to elastic wind-up of a drive train without extraordinary cost penalties.

BRIEF SUMMARY OF THE INVENTION

There is, therefore, provided in practice of this invention according to a presently preferred embodiment a reversible stepping actuator comprising a clockwise ratchet wheel and a counterclockwise ratchet wheel coaxially fixed together. The pair of ratchet wheels are rotated by a pair of similar operator means, each of which comprises a drive pawl for engaging one ratchet wheel and driving it in one direction, such as clockwise, and a locking pawl engaging the other ratchet wheel and preventing rotation of the wheels in the same direction, e.g., clockwise. A linear actuator sequentially disengages the locking pawl from its ratchet wheel and engages the drive pawl with its ratchet wheel for rotating the wheels an incremental distance, for example, in the clockwise direction. The ratchet wheels are connected for rotating an output shaft a selected increment. By having two similar operator means, the locking pawl of one serves to prevent back drive as the drive pawl of the other operator means advances the ratchet wheels.

BRIEF DESCRIPTION OF THE DRAWINGS

These and other features and advantages of the present invention will be appreciated as the same becomes better understood by reference to the following detailed description when considered in connection with the accompanying drawings wherein:

FIG. 2 is a transverse cross section of the stepping actuator; and

FIG. 3 is a fragmentary plan view partly cut away indicating operation of the stepping actuator.

DETAILED DESCRIPTION

Figure 1:
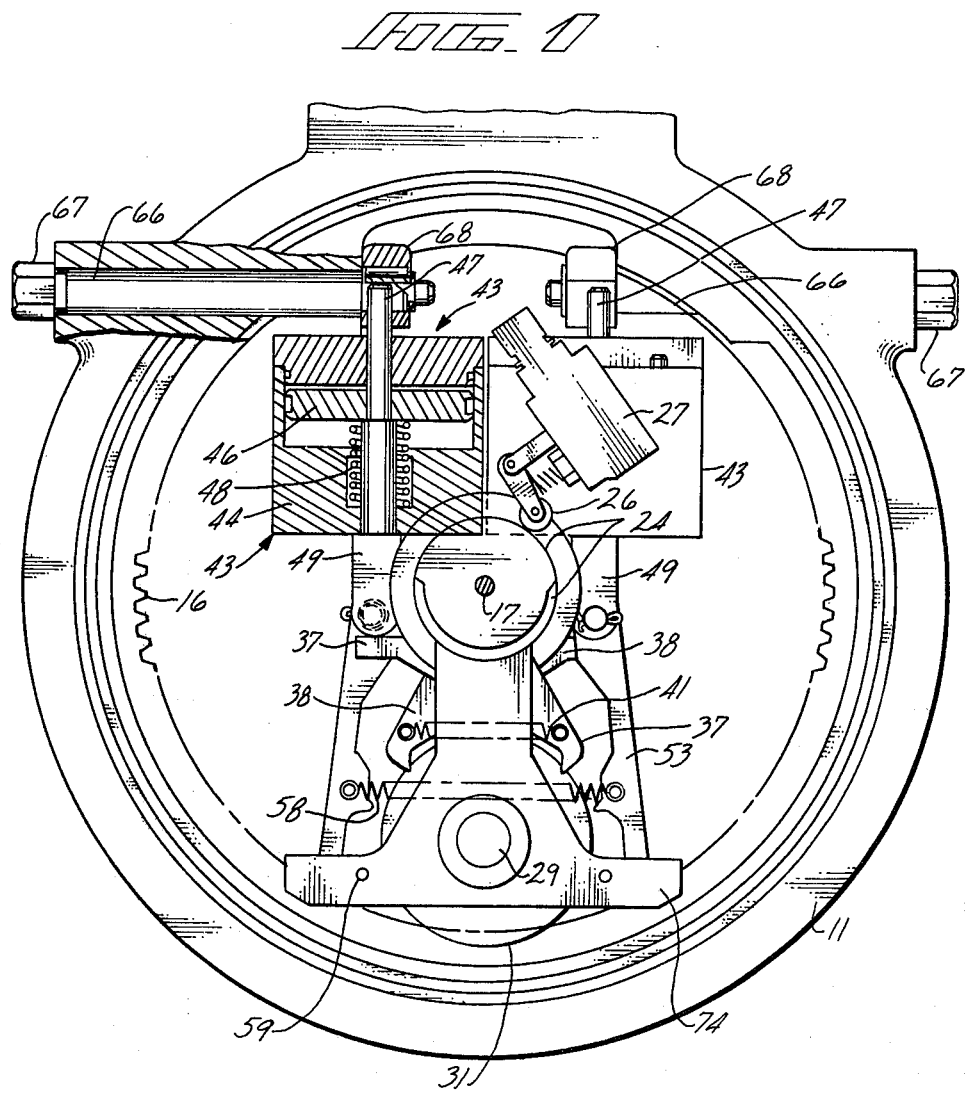
FIG. 1 is a plan view with a cover removed and partly in cross section of a reversible stepping actuator constructed according to principles of this invention.

The stepping actuator is housed in an explosion proof housing having a lower casing half 11 illustrated to the left in FIG. 2 and an upper casing half 12. The upper casing 12 is removed in FIG. 1 to show the internal structure of the actuator. In general, the lower casing 11 is secured to a valve housing or the like (not shown) and the basic operating mechanisms are mounted in the lower casing. The upper casing 12 is readily removed for maintenance and the like.

Output from the stepping actuator is provided by way of a socket 13 having a keyway 14 for driving connection to an output shaft which can, for example, be the stem of a multiple orifice flow control valve. The socket 13 is coaxial with an output ring gear 16. In FIG. 2 the ring gear and output socket subassembly are illustrated as if integral, however, it will be apparent that such an assembly is conveniently made by assembling components which are bolted or welded together. Details such as this mode of construction have been deleted for clarity of illustration since not required for an understanding of this invention.

An indicator shaft 17 is connected to the output ring gear and socket by a roll pin 18. A visual indicator wheel 19 on the other end of the indicator shaft can be used for observing the position of the actuator for determining whether a valve is opened or closed, for example.

A spur gear 21 is also secured to the indicator shaft and drives a second spur gear 22 on the shaft of a potentiometer 23. The potentiometer can be connected to an external electric circuit for remote indication of the position of the output socket. Remote indication is useful when the stepping actuator is used on a subsea wellhead, for example. A pair of cams 24 are also secured to the indicator shaft 17. Each of these cams is engaged by a cam follower 26 connected to a switch 27 (one of which is illustrated in the drawings). The cams and switches set limits on the rotation of the output socket by preventing actuation of the stepping actuator beyond ranges permitted by the cams.

The output ring gear 16 is engaged by a pinion gear 28 secured to a drive shaft 29. A pair of coaxial ratchet wheels 31 and 32 are secured to the drive shaft 29 by a key 33. As best seen in FIG. 3 the upper ratchet wheel 31 has a plurality of asymmetrical teeth 34 on its circumference suitable for rotating the ratchet wheel in the clockwise direction (as viewed from above). Similarly the lower ratchet wheel 32 has asymmetrical teeth 36 arranged for driving the ratchet wheel in the counterclockwise direction. Each tooth on the ratchet wheels has a "loaded" flank that extends substantially radially on the wheel. The opposite unloaded flank of each tooth extends at an angle of about 60° relative to a radius of the ratchet wheel, that is, the angle at the root of each tooth is about 60°. The radially extending flank of each tooth is referred to as the loaded flank since that is the face that carries the force upon driving or locking the ratchet wheel.

The pair of opposite ratchet wheels can be considered as a single wheel with two dissimilar faces since secured together on a common shaft. It is convenient to form the ratchet wheel subassembly as described and illustrated, however, since identical ratchet wheels can be used and their directions simply reversed for providing ratchets for driving in either of two opposite senses.

A pair of locking pawls 37 and 38 are mounted on a common locking pawl shaft 39 so that the two locking pawls can scissor relative to each other. The locking pawls are each centrally mounted on the locking pawl shaft 39 as a bell crank. A locking pawl spring 41 interconnects similar arms of the two locking pawls for biasing them towards each other and towards the ratchet wheels. This arm of each locking pawl includes a point or click 42 at the end for engaging teeth on the respective ratchet wheel.

As a matter of convenience in nomenclature the upper locking pawl 37 in the illustrated embodiment is referred to as the clockwise locking pawl since its click engages the clockwise ratchet wheel 31. The clockwise locking pawl permits rotation of the ratchet wheels in the clockwise direction and prevents back drive of the ratchet wheels in the counterclockwise direction. Likewise, the lower locking pawl 38 is referred to as the counterclockwise locking pawl since it engages the teeth 36 on the counterclockwise ratchet wheel 32 permitting rotation in the counterclockwise direction and preventing rotation in the clockwise direction. Such terminology could be reversed if the ratchet wheels were viewed from below.

Since the locking pawl spring 41 biases the locking pawls towards the ratchet wheels the normal position of the locking pawls is in engagement with the ratchet wheels thereby preventing rotation of the ratchet wheels in either direction.

A pair of linearly reciprocable pneumatic actuators 43 are mounted side-by-side in the housing. The two actuators are similar and one is shown in longitudinal cross section in FIG. 1. Each actuator comprises a cylinder 44 containing an axially movable piston 46. The piston is secured to an actuator shaft 47 and is biased in a direction generally away from the ratchet wheels by a spring 48. A clevis 49 having a transversely rounded outer end 51 is secured onto the actuator shaft 47 and secured by a roll pin 52.

An elongated clockwise drive pawl 53 is connected to one actuator 43 and an elongated counterclockwise drive pawl 54 is connected to the other actuator. A nomenclature similar to the locking pawls is employed for the drive pawls. Thus the upper drive pawl 53 which engages the upper clockwise ratchet wheel 31 is referred to as the clockwise drive pawl. Similarly, the lower drive pawl 54 which serves to drive the lower ratchet wheel 32 in the counterclockwise direction is referred to as the counterclockwise drive pawl.

Each of the drive pawls 53 and 54 is connected into the slot of its respective clevis by a transverse mounting shaft 56 secured in place by cotter keys 57. This mounting permits the drive pawls to pivot relative to the clevis and stroke with the stroke of the piston of the actuator.

The two similar drive pawls 53 and 54 are on opposite edges of the pair of ratchet wheels. A pair of drive pawl springs 58 bias the drive pawls towards each other and towards the ratchet wheels. Pivoting of each drive pawl towards the ratchet wheels is restrained by a fixed dowel 59. When the actuators 43 are retracted, the drive pawls are not in engagement with the ratchet wheels. This is regarded as the normal position of the drive pawls, i.e., disengaged.

Each drive pawl includes an inwardly facing ramp surface 61 near its end remote from the pneumatic actuator 43. Nearer the actuator is flat surface 62 extending parallel to the length of the elongated drive pawl. When the actuators are in their retracted position as indicated in FIG. 1 (and also illustrated by the clockwise drive pawl 53 in FIG. 3), the ramp 61 bears against the dowl 59 and restrains the drive pawl to maintain it out of engagement with the ratchet wheel. When a pneumatic actuator is in an extended position as indicated with the counterclockwise pawl 54 in FIG. 3, the flat surface 62 is adjacent the dowel 59 and a drive point 63 on the drive pawl engages a tooth on the respective ratchet wheel.

When it is desired to operate the stepping actuator and rotate the output shaft one increment of rotation, compressed air is applied to the cylinder 44 of one actuator 43 for moving the piston 46 and shaft 47 in a direction that compresses the piston biasing spring 48. This extension of the actuator causes stroking of the drive pawl connected to the actuator shaft by way of a clevis 49. As the drive pawl advances from the retracted toward the extended position, the ramp surface 61 moves along the dowel 59 and the springs 58 cause the drive point 63 to move in a direction approximately parallel to the unloaded flank of a tooth on the respective ratchet wheel. Once the point is engaged with the tooth the drive pawl has advanced so that the ramp is beyond the dowel and the flat surface 62 moves along the dowel. The point 63 then moves in a direction approximately tangent to the ratchet wheel, thereby advancing the ratchet wheel. The total stroke of the actuator and drive pawl is preferably sufficient for advancing the point 63 in a direction tangent to the ratchet wheel about 1.3 times the tooth spacing, thereby assuring advance of the ratchet wheel by an increment of one tooth spacing.

As pointed out above the locking pawls 37 and 38 are normally in engagement with the respective ratchet wheels preventing rotation of the ratchet wheels in either direction. Means are therefore provided for disengaging the respective locking pawl from the ratchet wheel to permit rotation of the wheels by a drive pawl.

Each locking pawl includes an arm 64 which is engaged by the rounded end 51 of a clevis 49 when the respective actuator is advanced towards its extended position. The clevis cams the locking pawl in rotation around the locking pawl shaft 39 thereby disengaging the point 42 from the ratchet wheel. The arm 64 is arranged so that the point is fully withdrawn from engagement with any tooth on the ratchet wheel before the point 63 on the drive pawl enters into driving engagement with the tooth being driven.

The actuators and pawls form a pair of substantially similar means for operating the ratchet wheels, one for advancing the wheels clockwise and one for advancing the wheels counterclockwise. The two operator means differ only in the ratchet wheels on which they operate and the consequent offsetting of the elements of the operator to engage the appropriate ratchets.

Recapitulating, the mode of operation for advancing the ratchet wheels counterclockwise is indicated in FIG. 3. As the actuator shaft 47 strokes in the general direction of the ratchet wheels the rounded end 51 on the clevis engages the bell crank arm 64 on the clockwise locking pawl 37 causing the locking pawl to pivot and disengage its point 42 from the clockwise ratchet wheel.

Meanwhile the counterclockwise drive pawl moves so that the ramp 61 slides along the dowel 59 and the point 63 moves approximately parallel to the unloaded flank of a tooth 36 on the counterclockwise ratchet wheel 32. When the stroke has progressed far enough that the point 42 is completely disengaged from the clockwise ratchet wheel, the flat surface 62 on the drive pawl is adjacent the dowel 59 and the point 63 commences to move tangent to the counterclockwise ratchet wheel. The stroke continues until the travel of the point in a direction tangent to the wheel is about 1.3 tooth spacings.

Meanwhile, the point 42 on the counterclockwise locking pawl 38 has climbed the unloaded flank of a tooth 36 on the counterclockwise ratchet wheel and dropped into the next space between teeth due to the biasing force of the locking pawl spring 41.

The actuator and drive pawl can then be retracted by releasing pneumatic pressure in the cylinder of the actuator. The point 63 on the drive pawl rides up an unloaded flank of a tooth on the counterclockwise ratchet wheel and the drive pawl is disengaged from the ratchet wheel by the ramp 61 engaging the dowel 59. Meanwhile the point 42 on the clockwise locking pawl swings back into engagement with the clockwise ratchet wheel. The point 42 on the counterclockwise locking pawl 38 prevents rotation of the ratchet wheels in the clockwise direction thereby preventing back drive of the ratchet wheels due to elastic deformation in the drive train.

To drive the ratchet wheels one more increment, another application of pneumatic pressure is made to the actuator.

As the ratchet wheels rotate one tooth spacing in response to one reciprocation of the pneumatic actuator 43, the drive shaft 29 and pinion 28 are rotated through a comparable angle. This causes an incremental rotation of the output ring gear 16 and an output shaft in the output socket 13. Because of a large gear ratio between the pinion and the ring gear, the angle through which the output shaft turns is significantly smaller than the angle of rotation of the ratchet wheels. There is also a substantial increase in torque so that a high torque output can be obtained with a nominal magnitude of pneumatic pressure. For example, an output torque of 15,000 inch pounds can be provided with a four inch diameter pneumatic piston operated at only about 100 psi air pressure.

It should be recognized, of course, that hydraulic pressure can also be employed for operating such a reversible stepping actuator.

It is sometimes desirable to operate such a stepping actuator manually instead of pneumatically or hydraulically. Means are therefore provided for manually operating each of the ratchet wheels. This is done by manually stroking shaft 47 of one of the pneumatic actuators. A laterally extending shaft 66 extends through a side of the lower casing 11 and has a hexagonal head 67 at its outer end for receiving a wrench. A knuckle 68 is affixed to the inner end of the shaft. An eccentric camming lobe 69 (FIG. 2) on the knuckle presses against the end of the actuator shaft 47 when the manual shaft is pivoted. Each rocking of the knuckle advances the selected ratchet wheel one tooth spacing. Either of these manual operating means can be used for advancing the ratchet wheels in a desired direction.

When the direction of rotation of the output shaft is reversed, there may be substantial wind-up stored in elastic deformation of the drive train. Back drive of the ratchet wheels has been prevented by one of the locking pawls. When direction is reversed, that locking pawl is disengaged from the ratchet wheels and the stored wind-up is immediately released. It is observed that when a large torque is required to rotate a disk on a multiple orifice valve, the stored elastic deformation can cause the ratchet wheels to back drive a substantial distance, such as three to five tooth spacings. No adverse effects of this rapid release of stored deformation have been observed.

The accompanying drawings include some additional elements of the structure of a stepping actuator important for assembly but only indirectly involved in practice of this invention. Thus, for example, the pneumatic actuators 43 are mounted on a support plate 71 bolted into the lower casing 11. This plate is not illustrated in FIG. 1 to show the output ring gear. The support plate 71 also provides support for a bearing 72 for the drive shaft 29. Another bearing 73 for the drive shaft is carried by a mounting plate 74 bolted to the support plate 71. The support plate and mounting plate 74 also provide constraint for the locking pawl shaft 39. Other such supporting elements, bearings, bushings, sleeves, pins, seals and the like are employed in construction of a stepping actuator and have been deleted from the drawings to avoid a welter of unnecessary details.

Although but one embodiment of reversible stepping actuator has been illustrated and descried herein, many modifications and variations will be apparent to one skilled in the art. It is therefore to be understood that within the scope of the appended claims the invention may be practiced otherwise than as specifically described.

What is claimed is:

1. A reversible stepping actuator for producing a reversible incremental output rotation in response to a pulse input comprising:
   a drive gear;
   a first ratchet wheel connected to the gear for driving the gear in a first sense of rotation;
   a second ratchet wheel connected to the gear for driving the gear in a second sense of rotation opposite to the first sense of rotation;
   a first drive pawl for engaging the first ratchet wheel and driving the first wheel in the first sense;
   a second drive pawl for engaging the second ratchet wheel and driving the second wheel in the second sense;
   a first locking pawl for engaging the first ratchet wheel and preventing rotation of the first wheel in the second sense;
   a second locking pawl for engaging the second ratchet wheel and preventing rotation of the second wheel in the first sense;
   means for maintaining both locking pawls in engagement with their respective ratchet wheels and both drive pawls out of engagement with their respective ratchet wheels when in a neutral position;
   first actuator means for disengaging the second locking pawl from the second ratchet wheel and at about the same time engaging the first drive pawl with the first ratchet wheel; and
   second actuator means for disengaging the first locking pawl from the first ratchet wheel and at about the same time engaging the second drive pawl with the second ratchet wheel.

2. A stepping actuator as recited in claim 1 wherein each locking pawl is disengaged from its respective ratchet wheel before loaded engagement of the corresponding drive pawl with its respective ratchet wheel.

3. A stepping actuator as recited in claim 1 comprising a drive shaft connected to the drive gear and wherein the first and second ratchet wheels are affixed to said drive shaft.

4. A stepping actuator as recited in claim 1 wherein each drive pawl includes a point for engaging a tooth on the respective ratchet wheel; and means for moving the drive pawl in a stroke wherein during a first portion of the stroke, the point moves approximately parallel to an unloaded flank of such a tooth and during a second portion of the stroke the point moves tangent to the ratchet wheel.

5. A stepping actuator as recited in claim 4 further comprising a guide dowel, a ramp on the drive pawl extending approximately parallel to the unloaded flank of such a tooth for engaging the guide dowel and a face on the drive pawl approximately parallel to a tangent to the ratchet wheel at the driven tooth.

6. A stepping actuator as recited in claim 1 wherein each locking pawl comprises a bell crank with a point one arm of the bell crank for engaging a tooth on its respective ratchet wheel.

7. A stepping actuator as recited in claim 6 wherein each actuator means engages the other arm of its respective locking pawl for rotating the bell crank and disengaging the point from the ratchet wheel.

8. A reversible stepping actuator comprising:
   a pair of interconnected ratchet wheels having teeth directed clockwise and counterclockwise respectively;
   means connected to the ratchet wheels for providing an output rotation in response to rotation of the ratchet wheels; and
   a pair of similar operator means for driving the ratchet wheels clockwise and counterclockwise respectively, such operator means comprising:
   a normally disengaged clockwise drive pawl;

a counterclockwise locking pawl with the counterclockwise ratchet wheel for preventing back drive of the ratchet wheels clockwise;

means for sequentially disengaging the counterclockwise locking pawl and engaging the clockwise drive pawl with the clockwise ratchet wheel for advancing the ratchet wheels clockwise;

a normally disengaged counterclockwise drive pawl;

a clockwise locking pawl with the clockwise ratchet wheel for preventing back drive of the ratchet wheels counterclockwise; and means for sequentially disengaging the clockwise locking pawl and engaging the counterclockwise drive pawl with the counterclockwise ratchet wheel for advancing the ratchet wheels counterclockwise.

9. A stepping actuator as recited in claim 8 wherein the ratchet wheels are coaxially fixed on a drive shaft and the operator means straddle the ratchet wheels.

10. A stepping actuator as recited in claim 8 wherein each means for disengaging and engaging comprises:
a fluid pressure actuator;
means for connecting the fluid pressure actuator to such a drive pawl for stroking the drive pawl in a direction generally tangential to the respective ratchet wheel.

11. A stepping actuator as recited in claim 10 wherein each such operator means further comprises means for resiliently biasing the drive pawl toward the respective ratchet wheel; and guide means engaging the drive pawl between a disengaged position at one end of the stroke of the actuator in which the drive pawl is disengaged from the ratchet wheel and an engaged position at the other end of the stroke of the actuator in which the drive pawl is engaged with the ratchet wheel, and along a path wherein the drive pawl moves partially radially relative to the ratchet wheel near the disengaged position and moves generally tangentially relative to the ratchet wheel near the engaged position.

12. A stepping actuator as recited in claim 11 wherein the means for guiding comprises a guide dowel, a ramp on the drive pawl extending approximately parallel to the unloaded flank of a tooth on the respective ratchet wheel for engaging the guide dowel in one portion of the stroke of the drive pawl, and a face on the drive pawl approximately parallel to a tangent to the ratchet wheel for engaging the guide dowel in another portion of the stroke of the drive pawl.

13. A stepping actuator as recited in claim 10 wherein each locking pawl comprises a bell crank with a point on the arm of the bell crank for engaging a tooth on the respective ratchet wheel and a camming surface on the other arm for engagement with the respective fluid pressure actuator.

14. A stepping actuator as recited in claim 13 wherein the locking pawl bell cranks are both mounted on a shaft parallel to the ratchet wheel shaft for scissoring on the locking pawl shaft and comprising means for resiliently biasing the locking pawls towards the ratchet wheels.

15. A stepping actuator as recited in claim 8 wherein each operator means comprises a fluid pressure actuator, and each locking pawl comprises a bell crank with a point on one arm of the bell crank for engaging a tooth on the respective ratchet wheel and means on the other arm for engagement with the respective fluid pressure actuator.

16. A stepping actuator as recited in claim 13 wherein the locking pawl bell cranks are both mounted on a shaft parallel to the ratchet wheel shaft for scissoring on the locking pawl shaft and comprising means for resiliently biasing the locking pawls towards the ratchet wheels.

17. A reversible stepping actuator comprising:
a pair of fixed together coaxial ratchet wheels having ratchet teeth for driving clockwise and counterclockwise respectively;
means for driving the ratchet wheels clockwise comprising:
a clockwise driving pawl for driving the clockwise ratchet wheel; and
a clockwise locking pawl for engaging the clockwise ratchet wheel for permitting rotation of the ratchet wheels clockwise and preventing rotation of the ratchet wheels counterclockwise;
means for driving the ratchet wheels counterclockwise comprising:
a counterclockwise drive pawl for driving the counterclockwise ratchet wheel; and
a counterclockwise locking pawl for engaging the counterclockwise ratchet wheel for permitting rotation of the ratchet wheels counterclockwise and preventing rotation of the ratchet wheels clockwise;
means for resiliently biasing the locking pawls towards engagement with their respective ratchet wheels;
means for holding each drive pawl in a disengaged position out of engagement with its respective ratchet wheel;
means for stroking the clockwise drive pawl from the disengaged position towards an engaged position in engagement with the clockwise ratchet wheel and retracting the counterclockwise locking pawl from engagement with the counterclockwise ratchet wheel for advancing the ratchet wheels one tooth spacing clockwise; and
means for stroking the counterclockwise drive pawl from the disengaged position towards an engaged position in engagement with the counterclockwise ratchet wheel and retracting the clockwise locking pawl from engagement with the clockwise ratchet wheel for advancing the ratchet wheels one tooth spacing counterclockwise.

18. A stepping actuator as recited in claim 17 wherein each locking pawl is disengaged from its respective ratchet wheel before loaded engagement of the corresponding drive pawl with its respective ratchet wheel.

19. A stepping actuator as recited in claim 17 wherein each drive pawl includes a point for engaging a tooth on the respective ratchet wheel and means for guiding each drive pawl in a path from the disengaged position towards the engaged position wherein during the first portion of the stroke the point moves approximately parallel to an unloaded flank of such a tooth and during a second portion of the stroke the point moves tangent to the ratchet wheel.

20. A stepping actuator as recited in claim 19 wherein the means for guiding each drive pawl comprises a guide dowel, a ramp on the drive pawl extending approximately parallel to the unloaded flank of such a tooth for engaging the guide dowel during the first portion of the stroke, and a face on the drive pawl approximately parallel to a tangent to the ratchet wheel at the driven tooth for engaging the guide dowel during the second portion of the stroke.

21. A stepping actuator as recited in claim 20 comprising means for resiliently biasing each drive pawl into engagement with its respective guide dowel and towards the ratchet wheels.

22. A stepping actuator as recited in claim 20 wherein the drive pawls are adjacent opposite edges of the ratchet wheels and comprising spring means interconnecting the drive pawls for resiliently biasing the drive pawls towards the ratchet wheels.

23. A stepping actuator as recited in claim 17 wherein each locking pawl comprises a bell crank with a point on one arm of the bell crank for engaging a tooth on its respective ratchet wheel.

24. A stepping actuator as recited in claim 17 wherein each means for stroking a drive pawl comprises a fluid pressure actuator for advancing the respective drive pawl from the disengaged position towards the engaged position.

25. A stepping actuator as recited in claim 24 wherein each locking pawl comprises a bell crank with a point on one arm of the bell crank for engaging a tooth on its respective ratchet wheel and means on the other arm of the bell crank for engagement with the fluid pressure actuator.

26. A reversible stepping actuator for producing an incremental output rotation in response to a fluid pressure pulse input comprising:
a clockwise ratchet wheel;
a counterclockwise ratchet wheel fixed coaxially to the clockwise ratchet wheel;
a pair of similar operator means for rotating the ratchet wheels, such an operator means comprising:
 a drive pawl for engaging the clockwise ratchet wheel and driving the ratchet wheels in the clockwise direction;
 a locking pawl engaging the counterclockwise ratchet wheel and preventing rotation of the ratchet wheels in the clockwise direction; and
 reciprocatable fluid pressure actuator means for sequentially disengaging the locking pawl from the counterclockwise ratchet wheel and engaging the drive pawl with the clockwise ratchet wheel for rotating the ratchet wheels in the clockwise direction an incremental distance; and
means for coupling the ratchet wheels to an output shaft for rotation of the output shaft.

27. A stepping actuator as recited in claim 26 wherein such a drive pawl comprises an elongated member connected at one end to the actuator means for stroking in a linear direction approximately tangent to the ratchet wheels and including a point for engaging a tooth on the respective ratchet wheel and further comprising means for guiding the other end of the elongated member in a stroke wherein during a first portion of the stroke the point moves approximately parallel to an unloaded flank of a tooth on the respective ratchet wheel and during a section portion of the stroke the point moves approximately tangent to the ratchet wheel.

28. A stepping actuator as rectied in claim 27 wherein the means for guiding comprises a fixed guide dowel, a ramp on the drive pawl extending approximately parallel to the unloaded flank of such a tooth for engaging the guide dowel during the first portion of the stroke and a face on the drive pawl approximately parallel to a tangent to the ratchet wheel at the driven tooth for engaging the guide dowel during the second portion of the stroke.

29. A stepping actuator as recited in claim 26 wherein such a locking pawl comprises a bell crank with a point on one arm of the bell crank for engaging a tooth on its respective ratchet wheel and a camming surface on the other arm of the bell crank for engagement with the actuator means for rotating the bell crank and disengaging the point from the ratchet wheel.

30. A stepping actuator for producing a reversible output rotation in response to a fluid pressure pulse input comprising:
a pair of fluid pressure actuators for stroking between a retracted position and an extended position;
a ratchet wheel having a first set of teeth forming a clockwise circumferential face and a second set of teeth forming a counterclockwise circumferential face offset axially from the clockwise face;
a pair of opposed locking pawls mounted for scissoring on a common shaft parallel to the ratchet wheel axis, each locking pawl having a point for engaging a tooth on a respective one of the faces of the ratchet wheel, for preventing rotation of the ratchet wheel in opposite directions;
means for resiliently biasing the locking pawls towards engagement of the points with the ratchet wheel;
a pair of opposed drive pawls on opposite edges of the ratchet wheel, each drive pawl including a point for engaging a tooth on a respective one of the faces of the ratchet wheel;
means for connecting each of the drive pawls to one of the actuators;
means for resiliently biasing the drive pawls towards engagement with the ratchet wheel;
guide means for holding each drive pawl out of engagement with the ratchet wheel when its connected actuator is in its retracted position and guiding the drive pawl through a ratchet advancing stroke as its connected actuator strokes from the retracted position toward the extended position; and
means for retracting the point of such a locking pawl from engagement with the ratchet wheel in response to extension of such an actuator for permitting rotation of the ratchet wheel by the drive pawl connected to that actuator.

31. A stepping actuator as recited in claim 30 comprising guide means and wherein such a drive pawl comprises:
an elongated bar connected to the respective actuator with the point being on a side of the bar adjacent the ratchet wheel; and
ramp means on the bar for engaging the guide means and directing the point approximately parallel to an unloaded flank of a tooth on the respective face of the ratchet wheel during a first portion of the stroke of the actuator from the retracted position toward the extended position and thereafter approximately tangentially to the ratchet wheel upon stroking of the actuator towards the extended position.

32. A stepping actuator as recited in claim 30 wherein such a locking pawl comprises a bell crank having the point on one arm for engaging a ratchet wheel tooth and a camming surface on the other arm of the bell crank for engagement with the respective actuator for rotating the bell crank and disengaging the point from the ratchet wheel.

33. A stepping actuator as recited in claim 30 wherein the camming surface on such a bell crank is sufficiently close to the respective actuator for disengaging the point from the ratchet wheel before the point on such a drive pawl engages the ratchet wheel.

34. A stepping actuator as recited in claim 30 comprising means for disengaging such a locking pawl from the ratchet wheel before loaded engagement of the corresponding drive pawl with the ratchet wheel.

* * * * *

UNITED STATES PATENT AND TRADEMARK OFFICE
CERTIFICATE OF CORRECTION

PATENT NO. : 4,403,523
DATED : September 13, 1983
INVENTOR(S) : Fritz O. Seger

It is certified that error appears in the above-identified patent and that said Letters Patent is hereby corrected as shown below:

```
Abstract, Line 3, "pressue" should be -- pressure --.
Column 7, line 55, "descried" should be -- described --.
Column 8, line 51, -- on -- should be inserted after "point"
                   and before "one".
Column 11, line 61, "section" should read -- second --.
Column 11, line 63, "rectied" should be -- recited --.
```

Signed and Sealed this

Third Day of July 1984

[SEAL]

Attest:

GERALD J. MOSSINGHOFF

Attesting Officer

Commissioner of Patents and Trademarks